R. H. WENTORF.
PERCOLATOR.
APPLICATION FILED MAR. 16, 1916.
1,297,425.
Patented Mar. 18, 1919.
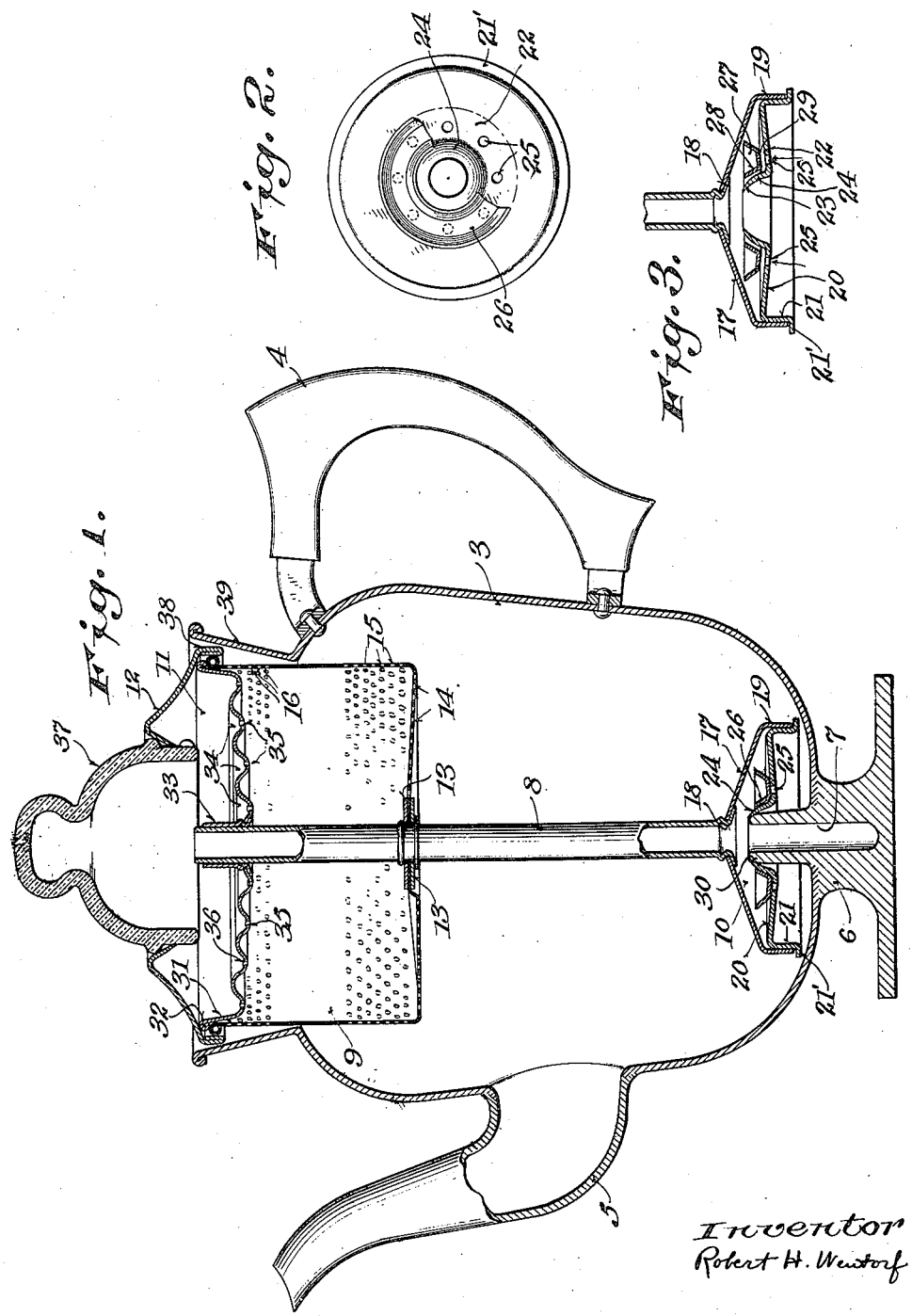

UNITED STATES PATENT OFFICE.

ROBERT H. WENTORF, OF WEST BEND, WISCONSIN, ASSIGNOR TO WEST BEND ALUMINUM COMPANY, OF WEST BEND, WISCONSIN, A CORPORATION OF WISCONSIN.

PERCOLATOR.

1,297,425.     Specification of Letters Patent.     Patented Mar. 18, 1919.

Application filed March 16, 1916. Serial No. 84,581.

*To all whom it may concern:*

Be it known that I, ROBERT H. WENTORF, a citizen of the United States, and resident of West Bend, in the county of Washington and State of Wisconsin, have invented new and useful Improvements in Percolators, of which the following is a description, reference being had to the accompanying drawings, which are a part of this specification.

The invention relates to percolators.

The invention is designed more particularly to improve the operation and construction of percolators.

Heretofore it has been customary to cement or rivet the aluminum spout on the aluminum percolator body and this produces an unsanitary and weak construction. It has also been customary to cement or screw on the aluminum foot or heater plate to the bottom of the aluminum percolator body and this produces an imperfect union between the parts which decreases the heat conductivity of the device and thus decreases its efficiency and also renders it unsanitary. To obviate these difficulties, I weld the aluminum spout and aluminum foot on the aluminum body of the receptacle and thus produce a sanitary, strong and efficient receptacle.

A further object of the invention is to provide a new and improved spreader upon which the liquid falls from the fountain tube.

A further object of the invention is to provide a new and improved form of fountain base.

The invention further consists in the several features hereinafter set forth and more particularly defined by claims at the conclusion hereof.

In the drawings:

Figure 1 is a vertical sectional view of the device embodying the invention, showing the valve in the fountain base in closed position;

Fig. 2 is a detail plan view of the valve in the fountain base;

Fig. 3 is a detail sectional view of the fountain base, showing the valve in raised position.

The receptacle comprises a body portion 3, preferably of aluminum, and provided with a handle 4, a spout 5, preferably of aluminum, welded thereon, and a heater foot 6, preferably of aluminum, welded thereon and having a vertically extending tubular bore 7. The parts thus welded together form an integral container which is easily cleaned and therefore sanitary, is devoid of joints which may become loosened or broken and renders the device more efficient, owing to the fact that the foot, being integral with the body, the conductivity of the receptacle is increased because the heat flows directly through similar metal.

The device further comprises a fountain tube 8, drip cup 9 mounted thereon, fountain base 10, spreader 11 and cover 12 arranged and operating as hereinafter described.

The fountain tube 8 is of ordinary construction, and the cylindrical drip cup 9 is secured thereto by washers 13. The drip cup is provided with a plurality of perforations 14 on the bottom thereof, a series of perforations 15 on the sides thereof adjacent the bottom and a series of perforations 16 on the sides thereof adjacent the top.

The fountain base 10 comprises a conical cup member 17 provided with an aperture 18 in the apex thereof communicating with the lower end of the fountain tube and secured thereto, a depending flange 19 on said member 17, a cover member 20 having a depending flange portion 21 slidably fitting within the flange 19, and a short flange 21' upon which the bottom edge of the member 17 rests, and a valve carried by the cover member 20. The cover member 20 has an inclined surface 22 extending from the flange 21 near to the center of the member, a central aperture 23 and a conoidal portion 24 extending from said aperture 23 to the inclined surface 22. The surface 22 is provided with a plurality of apertures 25 equidistant from the center of the cover member and the surface 22 adjacent said apertures forms a seat for the valve. The valve consists of an annular ring 26 formed so as to have an annular channel 27 and a conoidal flange 28 contacting with the conoidal portion 24 of the cover member 20. The transverse portion 29 of the ring 26 is designed to seat upon the surface 22 of the cover member and over the apertures 25. The conoidal portion 24 of the cover member 20 rests upon the conoidal end 30 of the foot 6 surrounding the bore 7 and thus through the cup 17 serves to support the fountain tube 8 and the parts of the device mounted thereon. The conoidal portion 24, adapted to contact with the flange 28, serves to guide and properly seat the valve and the channel 27 formed in the valve member produces a sensitive working valve as the water in the channel 27 acts to return the valve to closed position. The above described arrangement and construction of fountain base permits of ready cleaning of its parts, a necessary feature in a device of this kind.

The spreader 11 is provided with an annular flange portion 31 slidably fitting within the drip cup 9 and a bead 32 resting upon the top of said cup to seat the spreader thereon. A tube 33 is secured in the center of the spreader and slidably fits upon the upper end of the fountain tube 8. The bottom of the spreader tapers slightly downward from the flange 31 to the lower end of the tube 33 and is provided with a plurality of concentrically disposed annular channels 34. A series of apertures 35 are formed in, or near, the bottom of each of the channels 34 and these are preferably formed by punching from the under side through the bottom of the spreader and leaving the natural burs 36 formed during the punching process for a purpose hereinafter described.

The cover 12 is preferably provided with a centrally disposed removable glass top 37. This cover has a depending annular flange portion 38 which is designed to slidably engage and fit over the upper edge of the drip cup 9 and thus inclose the spreader 11 and the upper end of the fountain tube 8. Both the cover and drip cup 9 are designed to fit loosely within the flared opening 39 at the top of the body portion 3 and be supported therein by the fountain tube and fountain base, as previously described.

The operation of the device is as follows:—

The coffee, or other material to be infused, is placed in the drip cup 9, the retainer or spreader 11 placed within the drip cup at the top thereof and the cover 12 placed over the spreader and drip cup and all arranged within the receptacle, as shown in Fig. 1. On the heating of the receptacle, a portion of the liquid therein adjacent the foot 6 rises, lifts the valve 26 and passes up through the fountain tube from which it is distributed by the aid of the cover 12 over the spreader plate 11 and due to the inclined surface thereof passes over the whole of the spreader, for as soon as an outer channel becomes full of water it overflows into the next one nearer the center, owing to the inclined surface and thus insures the water reaching all portions of the plate and especially around the central portion thereof where it is generally most needed. The water on the spreader 11, being thus distributed within the channels 34, drips through the burred apertures 35 onto the material within the drip cup and then through the perforations therein into the vessel, thus forming the coffee or other infusion.

The natural burs 36 have a peculiar function in that they prevent the heated liquid from flowing through the holes 35, but only allow it to drip, drop by drop, into the cup which is essential in the making of good coffee. I have found, by experiment, that the burs must be on the upper surface of the spreader for if they are on the under surface the liquid will not drip and will only flow through the holes when under considerable pressure. The cover 12 is fitted on the drip cup 9 to form a closed receptacle for the purpose of preventing overflow of grounds from the cup and for the further purpose of preventing overflow of the contents from the pot or receptacle, owing to the fact that the heated water in the fountain tube will lift the drip cup and the fountain tube and base upwardly from the bottom of the receptacle should the drip cup become full and this will permit the colder water in the body of the receptacle to come in at the bottom and thus prevent an overflow of the contents of the receptacle. The construction of valve previously described produces a more sensitive acting valve than a flat heavy valve of the kind generally used.

What I claim as my invention is:—

1. In a percolator, the combination with a fountain tube and a drip cup mounted thereon, of a spreader plate disposed within said drip cup and having its bottom tapering downwardly from its outer edge to its center, said bottom provided with a plurality of concentrically disposed channels and a plurality of apertures in the bottoms of said channels.

2. In a percolator, the combination, with a fountain tube and a drip cup, of a spreader plate disposed within said drip cup and having its bottom tapering downwardly from its outer edge to its center, said bottom provided with a plurality of concentrically disposed annular channels and a plurality of naturally burred holes within said channels with the burs on the upper side of the plate.

In testimony whereof I affix my signature.

ROBERT H. WENTORF.